United States Patent [19]

Schumacher

[11] 4,177,145
[45] Dec. 4, 1979

[54] TWO-WAY FILTER-DRIER FOR HEAT PUMP SYSTEMS

[75] Inventor: Ernest W. Schumacher, De Soto, Tex.

[73] Assignee: Virginia Chemicals Inc., Portsmouth, Va.

[21] Appl. No.: 902,398

[22] Filed: May 3, 1978

[51] Int. Cl.² .................................................. B01D 15/00
[52] U.S. Cl. .................................. 210/136; 210/266; 210/DIG. 6
[58] Field of Search .......................... 55/316, 387–389; 62/474; 137/539; 210/136, 266, 282, 287, 288, 356, 435, 438, 439, 446, DIG. 6, DIG. 7

[56] References Cited

U.S. PATENT DOCUMENTS

| | | | |
|---|---|---|---|
| 1,539,910 | 6/1925 | Parish | 210/439 |
| 2,896,663 | 7/1959 | Mena | 137/539 |
| 3,178,022 | 4/1965 | Balogh | 210/136 |
| 3,265,213 | 8/1966 | Decker et al. | 210/136 |
| 3,815,752 | 6/1974 | Hoffman et al. | 210/DIG. 6 |
| 4,029,580 | 6/1977 | Lange | 210/DIG. 6 |
| 4,104,044 | 8/1978 | Lange | 210/136 |

Primary Examiner—Charles N. Hart
Assistant Examiner—Ivars Cintins
Attorney, Agent, or Firm—Depaoli & O'Brien

[57] ABSTRACT

A filter-drier that provides two-way or bi-directional flow for a heat pump or other refrigeration system is described. This filter-drier contains a spring-loaded check valve at each end of an adsorption space containing an adsorbent such as activated alumina, molecular sieve silica gel or combination thereof. Each check valve is surrounded by a filter pad and a flexible diaphragm. Reverse-discharge and separate-discharge embodiments are particularly described.

21 Claims, 6 Drawing Figures

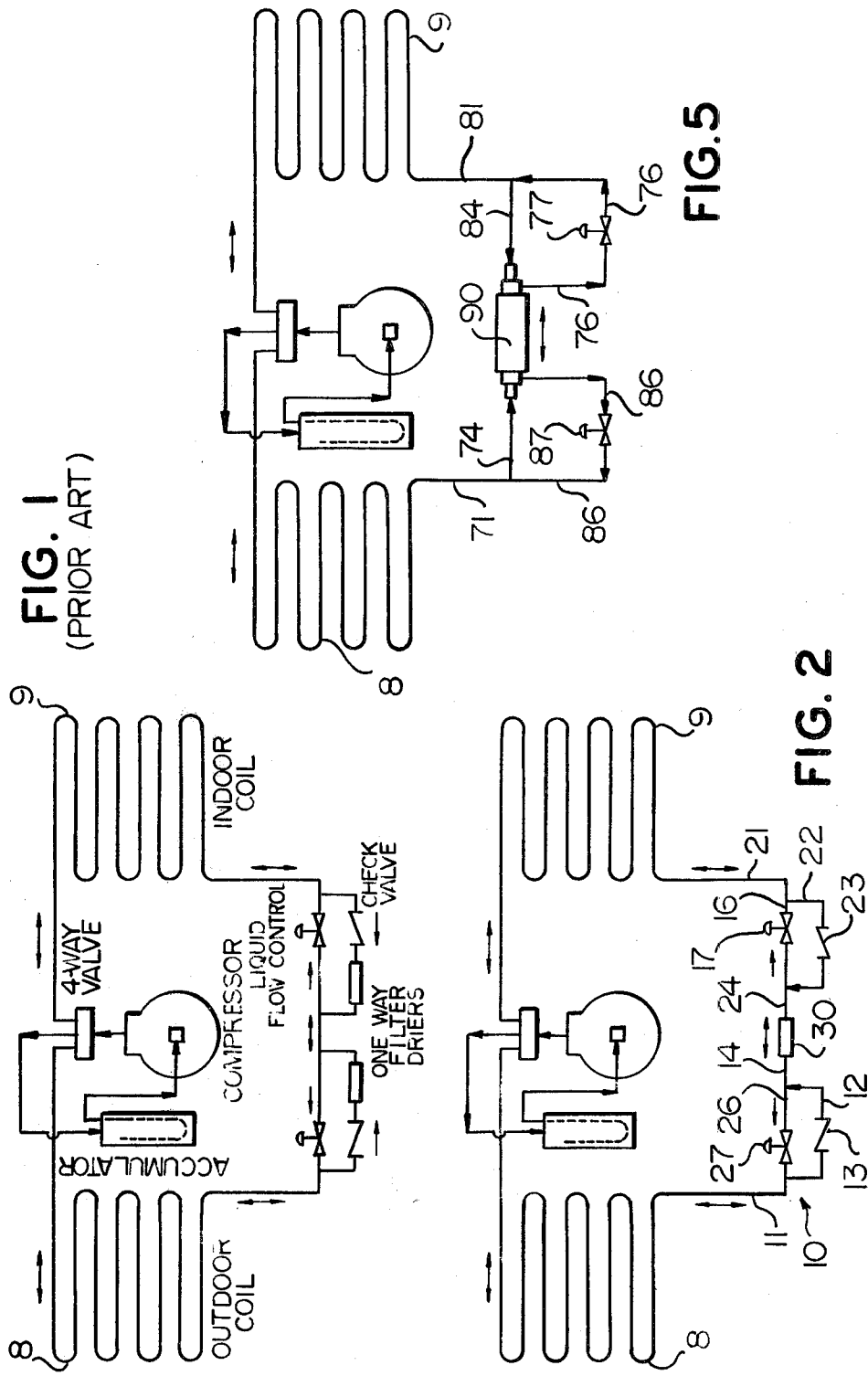

TWO-WAY FILTER-DRIER FOR HEAT PUMP SYSTEMS

BACKGROUND OF THE INVENTION

Field of the Invention

This invention relates to devices for maintaining a heat pump system in normal operating condition and particularly relates to filter-driers for purifying the liquid refrigerant.

Heat pump and refrigeration systems, in which flow in the high-pressure liquid line of the system is reversed when the system is changed from heating to cooling, cooling to defrost or vice versa, are becoming of growing importance. To obtain proper filtration and contaminant retention, two filter-driers are normally combined with external check valves so that flow through each filter-drier is always in the same direction. The reason for such unidirectional flow is to enable a filter-drier to properly perform its filtration function at all times, because if the flow in the unidirectional device is reversed, some of the solid contaminant retained in the filter media can and will be flushed back into the system.

Devices which utilize a plurality of check valves include U.S. Pat. No. 3,299,661 for a check-valve manifold, containing three spherical balls which combine the function of four check valves in a bi-directional heat pump system that enables flow into the expansion valve to be unidirectional, regardless of the position of the reversal valve.

U.S. Pat. No. 3,311,454 describes a testing apparatus which includes a holding chamber between a pair of top and bottom portions and a centrally disposed tube of transparent material with a pair of ball check valves at the ends thereof.

U.S. Pat. No. 3,731,678 describes a respirator for removing smoke and noxious fumes from air before inhaling thereof. It comprises a casing filled with absorbent material and a coaxially disposed conduit which is closed at its lower end by a flapper-type exhalation check valve. A flapper-type inhalation check valve also covers the air outlet openings from the casing.

As an example of the state of the art of heat pump systems, U.S. Pat. No. 4,045,977 describes a self-operating excess refrigerant storage system for a heat pump. This system includes an expansion valve, a filter-drier, and a unidirectional check valve which bypasses the expansion valve.

No device is known that can combine the functions of a pair of filter-driers within a single apparatus so that heat pump systems can be simplified and the costs thereof can be lowered. There is accordingly a need for a filter-drier which can perform its function when the liquid is flowing in either direction within the high-pressure liquid lines of a heat pump system.

SUMMARY OF THE INVENTION

It is therefore an object of this invention to provide a filter-drier in which contaminants in the liquid of a heat pump system can be removed when the liquid is flowing in either direction.

It is also an object to provide a filter-drier in which the inflow and the outflow move in reverse directions through the same connectors.

It is further an object to provide a filter-drier in which the inflow and the outflow in each direction are respectively received and discharged through separate lines.

In accordance with these objectives and the principles of this invention, a filter-drier is herein described which comprises an enclosing shell, a line connector at each end of th shell, and a two-way adsorption/filtration unit which is disposed within the shell between the connectors and is shock-absorbingly positioned by a biasing means. The adsorption/filtration unit comprises a contaminant adsorption means, such as activated alumina, which is disposed in an adsorption space within the enclosing shell and is retained between a pair of valve assemblies and a pair of pad assemblies. In combination, each valve assembly and pad assembly comprises a filter pad which annularly surrounds a valve bushing containing a spring-loaded check valve and is closed at its discharge end by an elastomeric annular diaphragm.

The adsorption/filtration unit is positioned within the enclosing shell by a retaining spring as the biasing means. The enclosing shell has an opening attached to a line connector at each end for connecting the filter-drier to the liquid lines of the heat pump system.

The separate-discharge embodiment additionally includes an entrance tube, connecting each inlet connector to its corresponding valve bushing, and an annular discharge cap which is sealably attached to the end of the shell, surrounding the inlet connector to which it is also sealably attached. Openings in the end of the shell are also provided to connect its interior to a discharge cap which is connected to a discharge line.

The invention can be more fully understood by referring to the accompanying drawings.

BRIEF DESCRIPTION OF THE DRAWINGS

FIG. 1 is a schematic flow sheet which shows a typical heat pump system of the prior art with two unidirectional liquid-line filter-driers, each provided with a series-connected check valve.

FIG. 2 is another schematic flow sheet for a typical heat pump system with the reverse-discharge bi-directional filter-drier of this invention.

FIG. 5 is a schematic of a heat pump system having the separate-discharge bi-directional liquid-line filter-drier of this invention.

DESCRIPTION OF THE PREFERRED EMBODIMENTS

Figure 4:
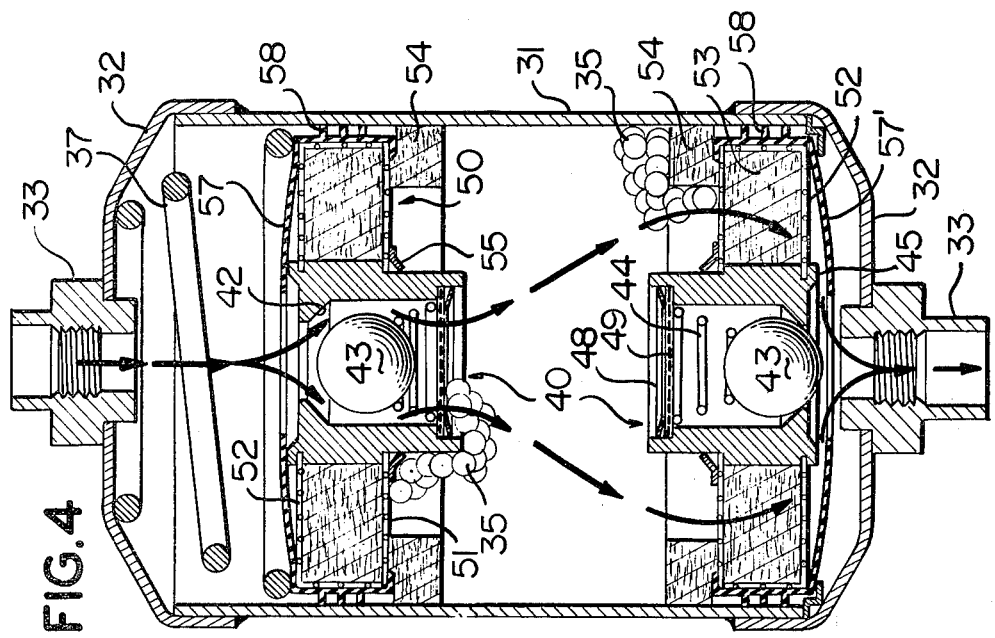
FIG. 4 is the same sectional view as FIG. 3 in which the flow is in the opposite direction, from the indoor coil towards the outdoor coil.

In the heat pump system shown in FIG. 2, for example liquid flow from outdoor coil 8 to indoor coil 9 is cooling flow in order to provide heat-exchange liquid for expanding within indoor coil 9, thus removing heat from an indoor space, as in air conditioning. Liquid refrigerant in line 11 from outdoor coil 8 enters line 12 and passes through check valve 13 and line 14 to enter a bi-directional filter-drier 30 of this invention within which contaminants are removed by an adsorption/filtration means. Cleaned liquid is discharged through line 24 to line 16 and through control valve 17 and line 21 before entering indoor coil 9.

In reverse, as when heating the indoor space with indoor coil 9, liquid moves through line 21, line 22, check valve 23, line 24, bi-directional filer-drier 30, line 14, line 26, control valve 27, and line 11 before entering outdoor coil 8.

Figure 3:
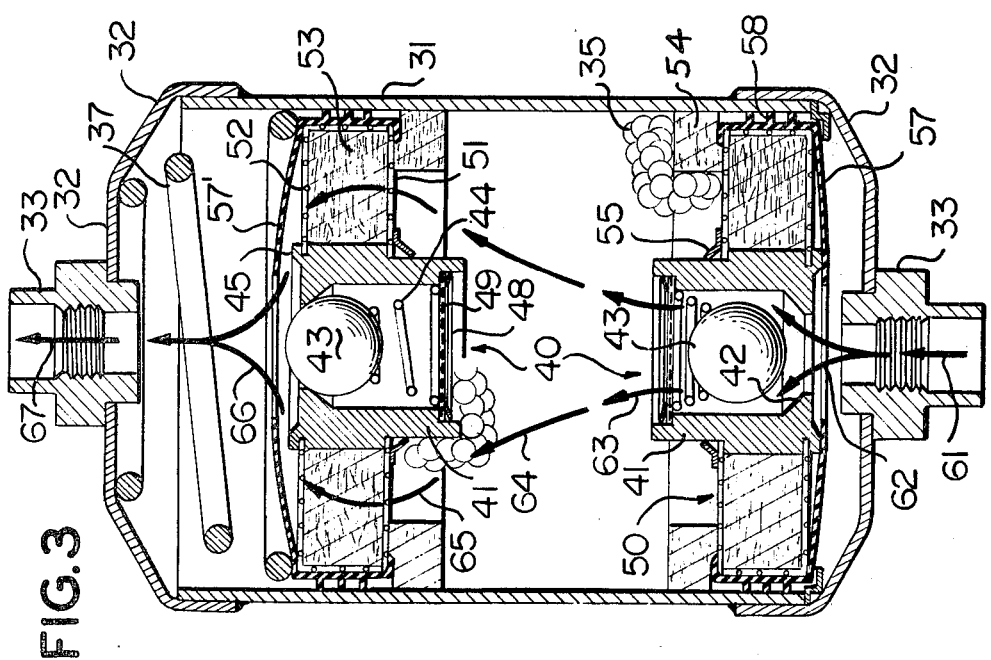
FIG. 3 is a sectional view of the reverse-discharge filter-drier of this invention in which flow is illustrated in one direction which is for reference purposes stated to be from the outdoor coil towards the indoor coil as shown in FIG. 2.

The bi-directional filter-drier 30 which is shown in FIGS. 3 and 4 is of the reverse-discharge type. It comprises a shell consisting of a cylinder 31 and a pair of end closures 32, a pair of line connectors 33, an adsorption/filtration unit, and a retaining spring 37 which positions the adsorption/filtration unit within the enclosing shell and is seated against a positioning ring.

The adsorption unit comprises an adsorption space filled with activated alumina or other adsorbent 35, a pair of valve assemblies 40, and a pair of pad assemblies 50.

Each valve assembly 40 comprises a valve bushing 41 having a valve seat 42 which surrounds a coaxial passageway therethrough, a valve ball 43, a valve spring 44, a bore retaining ring 48, and a valve screen 49.

Each pad assembly 50 comprises a peforated support plate 51 which annularly surrounds valve bushing 41 and rests against a shoulder thereof, a perforated support cup 52 which cooperatively fits against support plate 51 to form an enclosed annular space, a main filter pad 53 which fits within the enclosed space and annularly surrounds the valve bushing 41, a shaft-retaining ring 55 which positions the support plate 51 with respect to the valve bushing 41, a flexible diaphragm 57 which annularly surrounds the valve bushing 41 and closes off the perforated support cup 52, and a peripheral filter pad 54 which fits tightly against both cylinder 31 and support plate 51.

Each diaphragm 57 extends over the radial and longitudinal portions of cup 52 and also slightly overlaps plate 51. Diaphragms 57 also are each provided with a plurality of sealing rings 58 which position the pad assembly with respect to the inner surface of cylinder 31 and seal the adsorption space from the connectors 33. Diaphragms 57 are sufficiently flexible that they can be readily pushed away from cups 52 and diaphragm seat 45 to form an annular discharge port for the cleaned liquid leaving the adsorption/filtration unit Clearly, filter-drier 30 can be installed with either end connected to either outdoor coil 8 or indoor coil 9. However, for descriptive purposes, the bottom end of the filter-drier shown in FIGS. 3 and 4 will be assumed to be connected to line 14 in FIG. 2, and the top end of the filter-drier shown in FIGS. 3 and 4 will be assumed to be conneced to line 24 in FIG. 2.

The flow path through this reverse-discharge type of bi-directional filter-drier may thus be described as inflow 61 moving through bottom connector 33, flow 62 moving between the lower valve seat 42 and valve ball 43, flow 63 moving through screen 49 at the inner end of the lower valve bushing 41, flow 64 moving through the bed of activated alumina and/or other desiccant or adsorbent 35, flow 65 moving through the upper filter pad 53, flow 66 moving between the raised diaphragm 57' and the ring-like diaphragm seat 45, and discharge flow 67 moving through top connector 33 and entering line 24 as shown in FIG. 2.

The reverse flow is indicated by arrows in FIG. 4, but it need not be described in detail because the action is exactly to the contrary of that for FIG. 3.

A heat pump system that includes a separate-discharge bi-directional liquid-line filter-drier 90 is shown in FIG. 5. Analyzing this heat pump system in its air conditioning mode, liquid from outdoor coil 8 flows through line 71 into inflow line 74 and then into filter-drier 90. It discharges through line 76 and moves through control valve or other restrictive control device such as a capillary tube 77, which may be connected to a sensing means attached to indoor coil 9 for monitoring thereof, and then passes through line 81 to enter coil 9. In reverse direction as when heating a home during Winter-time, liquid moves through line 81, then through line 84 into filter-drier 90, next through line 86 and control valve 87 which is connected to sensing means attached to outdoor coil 8, and finally through line 71 to enter the outdoor coil.

Figure 6:
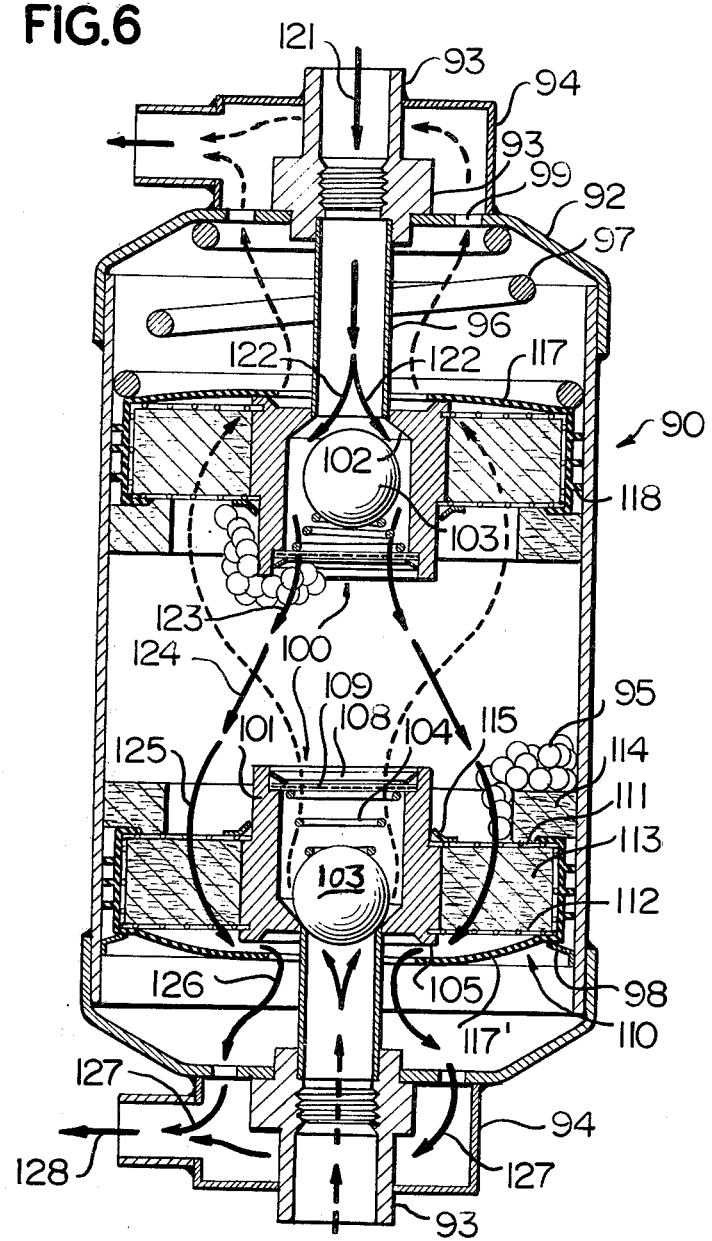
FIG. 6 is a sectional view of the reverse-discharge filter-drier, similar to FIGS. 3 and 4, in which inflow and outflow of liquid refrigerant is illustrated as moving through separate inlet and discharge lines.

This separate discharge type of bi-directional filter-drier, as shown in FIG. 6, comprises a shell consisting of a cylinder 91 and a pair of end closures 92, a pair of coaxially disposed line connectors 93, a pair of entrance tubes 96 which are slideably attached to the connectors 93, and a pair of annular discharge caps 94 which surround and are sealably attached to both connectors 93 and end closures 92, an adsoprtion/filtration unit, and a retaining spring 97 which in combination with a positioning ring 98 retains and positions the adsorption/filtration unit therebetween and within the shell. Shell openings 99 in each end closure 92 connect the interior of the shell to the interiors of discharge caps 94.

The adsorption/filtration unit comprises an adsorption space filled with activated alumina or other desiccant 95, a pair of valve assemblies 100, and a pair of pad assemblies 110.

Each valve assembly 100 comprises a valve bushing 101 having a valve seat 102 which surrounds a coaxial passageway therethrough, a valve ball 103 which fits against valve seat 102, a valve spring 104 which seats ball 103 against valve seat 102, a bore retaining ring 108, and a valve screen 109 which is disposed athwart the inner end of the passageway.

Each pad assembly 110 comprises a perforated support plate 111 which annularly surrounds valve bushing 101 and rests against a shoulder thereof, a perforated support cup 112 which cooperatively fits against support plate 111 to form an enclosed annular space, a main filter pad 113 which fits within the enclosed space and annularly surrounds the valve bushing 101, a shaft retaining ring 115 which holds support plate 111 against the shoulder of bushing 101, and a flexible diaphragm 117 which annularly surrounds entrance tube 96 and rests against both the annular diaphragm seat 105 and the radial surface of support cup 112.

Each diaphragm 117 extends over the radial and longitudinal portions of cup 112 and also slightly overlaps plate 111. Each diaphragm 117 is also provided with a plurality of sealing rings 118 which position the pad assembly with respect to the inner surface of cylinder 91 and seal the adsorption space from the discharge cap 94. They are also sufficiently flexible that they can be readily pushed away from diaphragm seat 105 to form a annular discharge port therebetween but are sufficiently strong to function as a flapper-type check valve, preventing flow into the adsorption space through the adjacent filter pad 113.

For descriptive purposes, it is assumed that top connector 93 is attached to line 84 from indoor coil 9 and bottom connector 93 is attached to line 74. Analyzing the flow passing through this separate-discharge embodiment 90 of the bi-directional filter-drier of this invention according to this assumption, liquid refrigerant leaves coil 9, moves through lines 81 and 84, and enters top connector 93 as flow 121, as shown in FIG. 6. It becomes flow 122 through tube 96 and between valve seat 102 and valve ball 103, then is flow 123 through valve screen 109, then becomes flow 124 through the bed of activated alumina or other desiccant 95, moves as flow 125 through filter pad 113, passes between flexed diaphragm 117' and diaphragm seat 105 as flow 126, and leaves through annular discharge cap 94 as flow 127, finally becoming flow 128 moving through line 86 and control valve 87 and then through line 71 to outdoor coil 8.

As an alternative separate-discharge embodiment, filter-drier 30 can be fitted with one entrance tube 96, which is mounted within retaining spring 37, and with one shorter entrance tube (not shown in the drawings) in the end of the shell which is opposite to retaining spring 37. The shell also must have the pair of annular discharge caps 94 and shell openings 99 in its end closures 32.

In operating a heat pump system, it is desirable that metering be done only by one control device 17, 27, 77, 87 at a time because such a flow control device meters at a rate that is in accordance with the demands of the coil with which it is connected by temperature or pressure sensing means. The filter-driers of this invention are designed to operate from a deep vacuum up to about 500 psi and their normal operating pressure is 100–400 psig. The interior of the filter-driers needs no corrosion protection. Ordinarily, the exterior need be protected from the atmosphere only, as with a corrosion-resistant paint.

The overall pressure differential across the filter-drier of this invention varies with the flow rate and the line sizes but is approximately equal to the current state of the art. Springs 37, 97, 44, 104 are made of spring steel wire. Springs 44 and 104 posses the minimum load characteristics that will provide a finite spring load when balls 43 and 103 are in the closed and seated position, in order to minimize pressure differentials across the filter-driers 30, 90.

Balls 43, 103 are preferably made of Nylon 66 and are very light, so that they are essentially weightless in the liquid refrigerant. Thus, spring loading with springs 44, 104 enables the filter-driers 30, 90 to be installed at any angle, including vertical. Diaphragms 57, 117 are flexible and are preferably made of rubber. They must seat securely against the diaphragm seats 45, 105 of each valve bushing 41, 101 so that flows can be completely prevented in one direction.

Filter pads 53, 113, 54, 114 are preferably constructed of fiberglass. Cylinders 31, 91 and closures 32, 92 of the shells can be made of a variety of materials, such as low-carbon steel, stainless steel, or brass. Bushings 41, 101 are preferably made of steel but can be aluminum or brass. Screens 49, 109 are preferably of low carbon steel but can satisfactorily be made of stainless steel or Monel. Retainers 48, 55, 108, 115 are spring steel.

The entrance tubes 96 of the separate-discharge embodiment 90 can be unequal in length, and the tube disposed within spring 97 is the only tube which need be slideably attached to bushing 101 or connector 93.

Tubes 96 can be made of nylon or other strong plastics, stainless steel, or any other material of which lines 74, 84 are constructed.

Because it will be readily apparent to those skilled in the art that innumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. A bi-directional filter-drier, comprising:
   A. a shell having line connectors at each end thereof;
   B. an adsorption/filtration unit, comprising:
      (1) an adsorption space filled with an adsorbent;
      (2) a valve assembly at each end of said adsorption space, each comprising:
         (a) a valve bushing having a passageway therethrough, and
         (b) a check valve within said passageway for allowing flow of liquid therethrough only from one said line connector toward said adsorption space, and
      (3) a pad assembly at each end of said adsorption space, each comprising:
         (a) a main filter pad which is radially disposed and is annularly positioned between said valve bushing and said shell;
         (b) a filter pad support means for positioning and supporting said main filter pad, and
         (c) an elastomeric annular diaphragm which is positioned between said bushing and said shell, said diaphragm being adapted to prevent flow in the direction permitted by the nearer check valve and to permit flow in the opposite direction thereto; and
   C. a retaining means for positioning said adsorption unit within said shell.

2. The filter-drier of claim 1 in which said check valve is a ball check valve.

3. The filter-drier of claim 2 wheein a valve seat is provided in said passageway and a ball valve is seated against said valve seat by a valve spring to form said ball check valve.

4. The filter-drier of claim 3 wherein said passageway is closed at its discharge end by a valve screen which is held in place by a bore retaining ring.

5. The filter-drier of claim 4 wherein said filter pad support means comprises a perforated support plate and a perforated support cup which cooperatively form an enclosed space within which said filter pad is disposed.

6. The filter-drier of claim 5 wherein said support plate is positioned by a shaft retaining ring.

7. The filter-drier of claim 6 wherein said diaphragm covers said support cup and a portion of said support plate.

8. The filter-drier of claim 7 wherein said valve bushing is provided with an annular diaphragm seat.

9. The filter-drier of claim 8 wherein an entrance tube connects each said line connector to the nearer of said valve bushings.

10. The filter-drier of claim 9 wherein each said diaphragm, in combination with the nearer of said bushings, forms a flapper-type check valve.

11. The filter-drier of claim 10 wherein an annular discharge cap surrounds and is sealably attached to one said line connector, is sealably attached to said shell, and is connected to a discharge line which is separate from the inlet line to said one line connector.

12. The filter-drier of claim 11 wherein said inlet line has no check valve external of said filter-drier.

13. A two-way filter-drier for use within the high-pressure liquid lines of a heat pump system, comprising:
A. an enclosing shell having a line connector at each end thereof;
B. a two-way adsorption/filtration unit which:
   (1) is disposed within said shell between said line connectors, and
   (2) comprises:
      (a) a pair of valve assemblies spaced axially apart,
      (b) a pair of pad assemblies, each said pad assembly annularly surrounding one said valve assembly, and
      (c) a contaminent adsorption means which is disposed in a single adsorption space within said enclosing shell and between said pair of valve assemblies and said pair of pad assemblies.

14. The two-way filter-drier of claim 13 which further comprises a biasing means for positioning said adsorption/filtration unit within said shell.

15. The two-way filter-drier of claim 14, wherein:
A. each said valve assembly comprises:
   (1) a valve bushing having a valve seat which surrounds a coaxial passageway therethrough and
   (2) a spring-loaded check valve which permits flow of refrigerant only toward said single adsorption space through said passageway; and
B. each said pad assembly comprises an elastomeric annular diaphragm which permits flow only away from said single adsorption space through an annular discharge port.

16. The two-way filter-drier of claim 15, wherein each said pad assembly further comprises:
A. a main filter pad which annularly surrounds one said valve bushing; and
B. a filter pad support means which comprises:
   (1) a perforated support plate which annularly surrounds said one valve bushing, and
   (2) a perforated support cup which cooperatively fits against said perforated support plate to form an enclosed annular space within which said main filter pad fits.

17. The two-way filter-drier of claim 16, wherein each said diaphragm extends over the radial and longitudinal portions of said perforated support cup and slightly overlaps said support plate.

18. The two-way filter-drier of claim 17, wherein each said diaphragm has an annular inner edge and is provided with a plurality of sealing rings which position said pad assembly with respect to the inner surface of said cylinder and seal said adsorption space from said line connectors.

19. The two-way filter-drier of claim 18, wherein each said valve bushing comprises a ring-like diaphragm seat against which said annular inner edge sealably fits.

20. The two-way filter-drier of claim 19, wherein each said diaphragm is sufficiently flexible that said diaphragm can be readily pushed away from said cup and said diaphragm seat to form said annular discharge port for the cleaned liquid leaving said adsorption/filtration unit, whereby said diaphragm forms a flapper-type check valve.

21. The two-way filter-drier of claim 20 which still further comprises:
A. an entrance tube connecting each said line connector to said valve bushing nearer thereto;
B. an annular discharge cap which is sealably attached to each end of said shell and to on said line connector; and
C. shell openings in said each end which connect each said annular discharge cap with the interior of said shell and provide flow connection from said annular diaphragm nearer thereto to each said annular discharge cap.

* * * * *